United States Patent

Ishii et al.

[11] Patent Number: 5,946,786
[45] Date of Patent: Sep. 7, 1999

[54] JOINING JIG AND JOINING MEMBER COUPLING METHOD USING THE JOINING JIG

[75] Inventors: Kanji Ishii; Tatsuhiko Yoshimura, both of Toyota; Tomotsugu Sakai, Okazaki; Masahiko Hamada, Konan, all of Japan

[73] Assignee: Toyota Jidosha Kabushiki Kaisha, Japan

[21] Appl. No.: 08/869,964

[22] Filed: Jun. 5, 1997

[30] Foreign Application Priority Data

Jun. 6, 1996 [JP] Japan ................................ 8-144228

[51] Int. Cl.$^6$ ............................................ B23Q 1/00
[52] U.S. Cl. .............................. 29/283.5; 29/517; 29/520
[58] Field of Search .......................... 29/516, 517, 520, 29/464, 465, 283.5; 72/370.16, 370.17; 269/152

[56] References Cited

U.S. PATENT DOCUMENTS

| | | | |
|---|---|---|---|
| 2,488,566 | 11/1949 | Sperry | 29/520 |
| 2,542,376 | 2/1951 | Torresen | 29/517 |
| 3,803,793 | 4/1974 | Dahl | 29/517 |
| 3,989,081 | 11/1976 | Sigmund | 29/520 |
| 4,012,828 | 3/1977 | Dahl | 29/517 |
| 4,867,625 | 9/1989 | Dixon | 29/517 |
| 5,722,647 | 3/1998 | Rattaro et al. | 269/152 |

FOREIGN PATENT DOCUMENTS

| | | |
|---|---|---|
| 0 286 244 | 10/1988 | European Pat. Off. . |
| 62-55003 | 11/1987 | Japan . |
| WO 94/01687 | 1/1994 | WIPO . |

OTHER PUBLICATIONS

T. Sakai et al., "A Study of Mechanism How Sleeve–Caulking–Fastening Method Produces Clamping Force", report filed in The 74th JSME Fall Annual Meeting in Japan, Sep. 21, 1996, vol. IV, No. 96–15, pp. 51–52.

K. Hoffer, "Konstruktionskataloge fur Blindnietverbindungen im Leichtbau", VDI–Berichte Nr. 493, (1983), pp. 49–59.

*Primary Examiner*—Robert C. Watson
*Attorney, Agent, or Firm*—Finnegan, Henderson, Farabow, Garrett & Dunner, LLP

[57] ABSTRACT

In a workpiece joining method using a joining jig, a distal end portion of a bolt shaft is inserted into each hole of at least one workpiece, and a sleeve is disposed onto a distal end portion of each bolt shaft. Then, an upper die of the joining jig is lowered toward the workpiece supported on a lower die so that while the workpiece is being pressed toward base end portions of the bolt shafts, a tightening portion of each nose provided on the upper die draws the outer wall of the corresponding sleeve, thus tightening the sleeves. As the tightening process progresses, the tightened portion of each sleeve progressively enters a relief portion formed immediately above the tightening portion. The thrust of the noses does not directly acts on the bolt shafts in the direction of their axes, so that the joining jig can apply a sufficient tightening force without being restricted by the strength of the bolt shafts.

9 Claims, 22 Drawing Sheets

F I G. 20
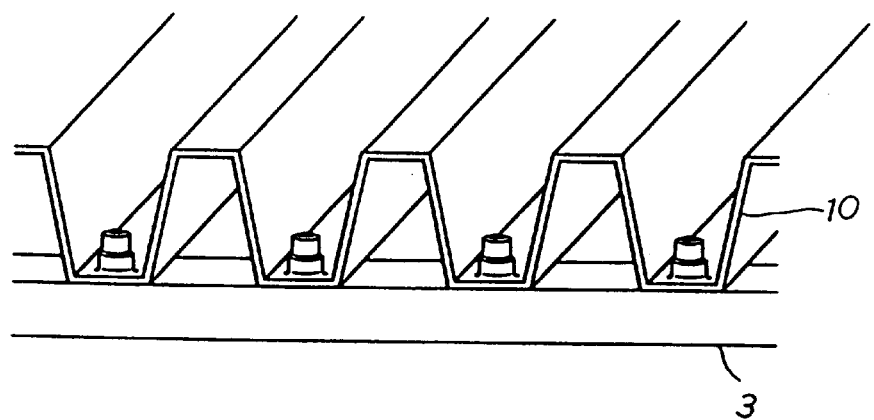
F I G. 21
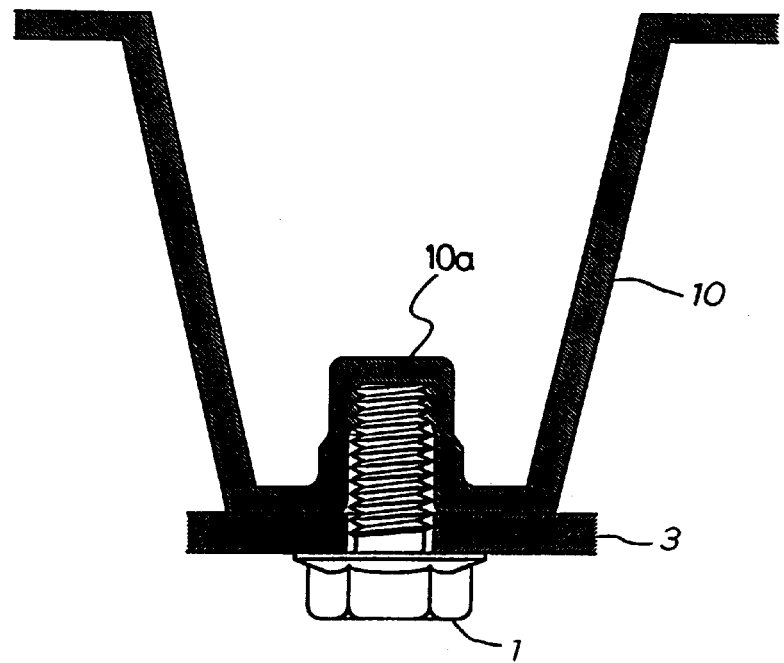

F I G. 25
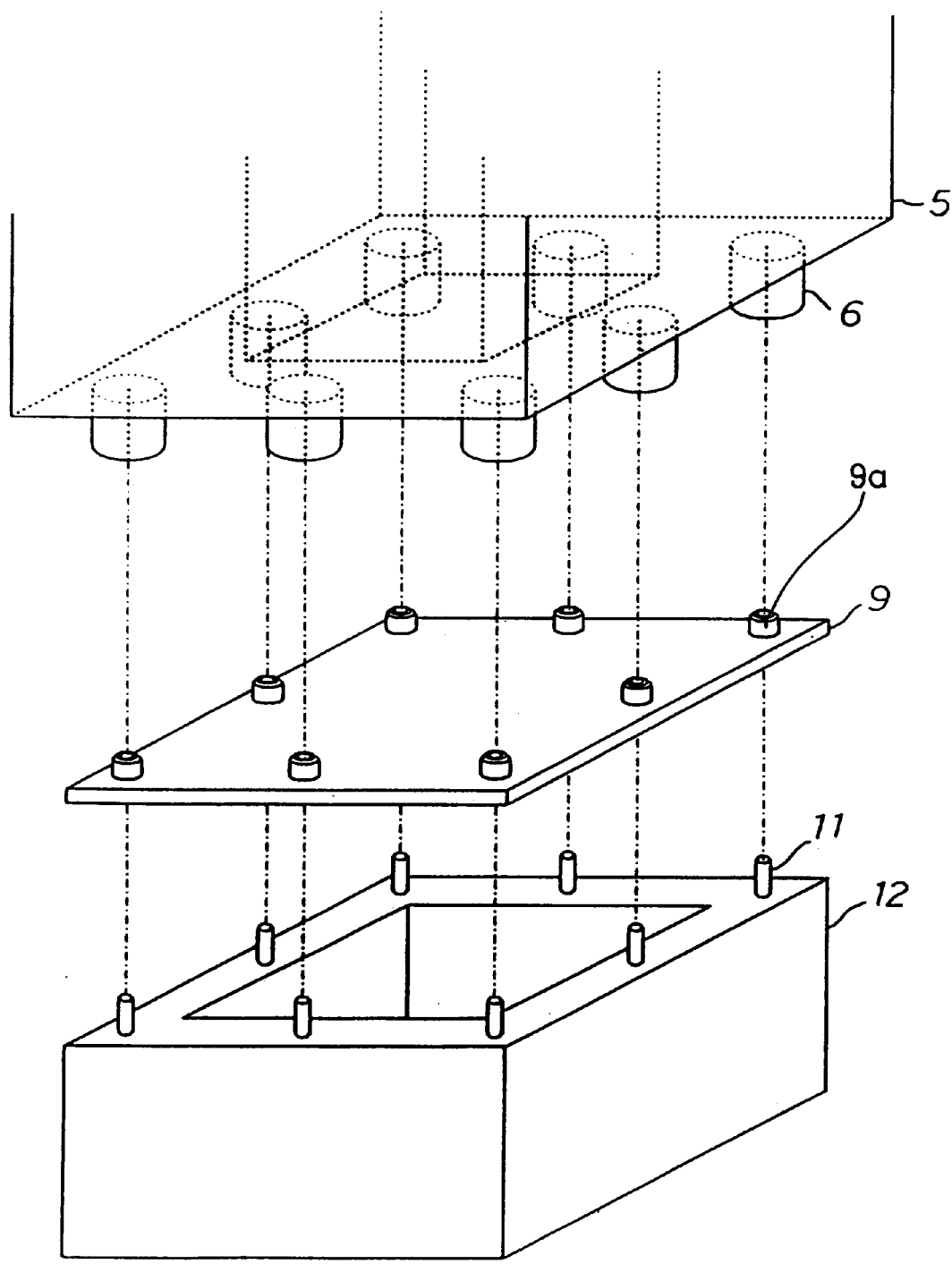

F I G. 27
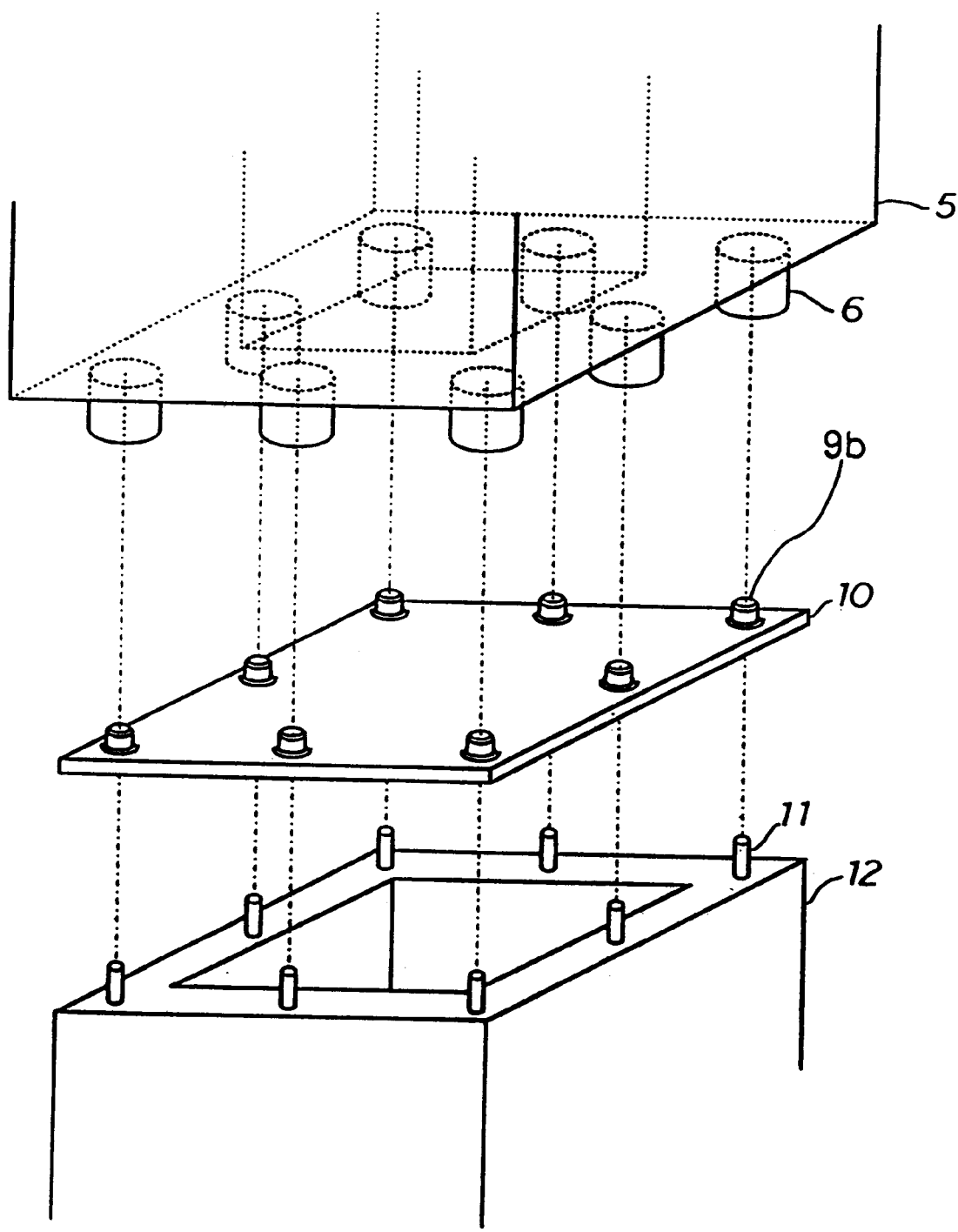

F I G. 28a
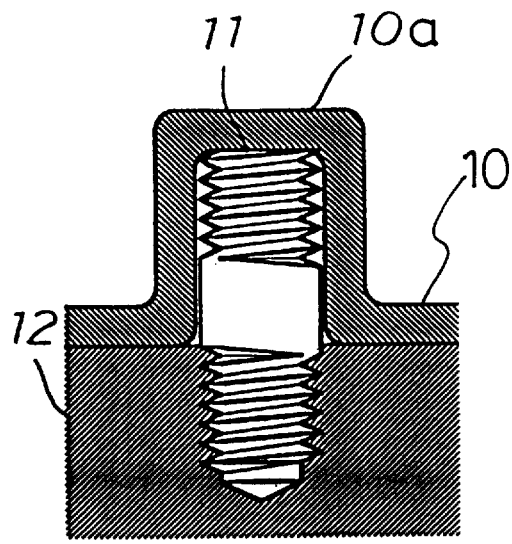
F I G. 28b
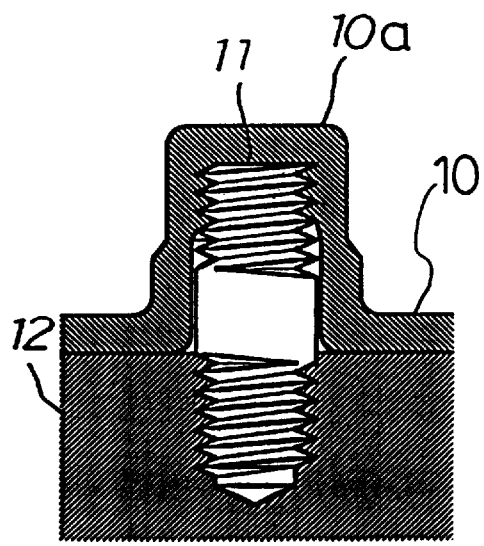

JOINING JIG AND JOINING MEMBER COUPLING METHOD USING THE JOINING JIG

BACKGROUND OF THE INVENTION

1. Field of the invention

The present invention relates to a joining jig for coupling joining members that join a plurality of workpieces, such as panels, and also to a joining member coupling method using the jig.

2. Description of the Related Art

In a conventional method for joining body panels of an automotive vehicle, plastically deformable sleeves are used as bolt fixing members similar to nuts, by disposing a sleeve onto a bolt shaft and deforming and tightening it to the bolt shaft. FIG. 29 illustrates such a method, where a sleeve 102 is to be deformed and tightened to a bolt shaft 101.

The bolt shaft 101 is welded to a workpiece $W_1$. The sleeve 102 has a flange 103, a tool engaging portion 104 and a barrel portion 105. The inside diameter of the sleeve 102 is greater than the diameter or the bolt shaft 101 before the sleeve 102 is deformed for tightening. The tool engaging portion 104 has a hexagonal shape viewed from above, making it easy to engage and turn a wrench or the like therewith for loosening when the sleeve 102 needs to be removed after it has been tightened. The barrel portion 105, having a generally circular shape, is the part to be deformed by the tightening operation.

To join workpieces, the bolt shaft 101 is first inserted into the hole of a workpiece $W_2$ and the sleeve 102 is loosely fitted onto the bolt shaft 101. Then, a nose 107 of a tool 106 is set over the bolt shaft 101 so that a clamp 108 of the tool 106 holds the bolt shaft 101. By pulling the clamp 108 up, the reaction force presses the nose 107 against the barrel portion 105 of the sleeve 102. The barrel portion 105 is thereby deformed by the nose 107 so as to reduce the inside diameter of the sleeve 102. The sleeve 102 is thus tightly fastened to the bolt shaft 101. Since the thread of the bolt shaft 101 is impressed onto the inside peripheral wall face of the sleeve 102, this method achieves a significantly tight attachment and restrains loosening of the bolt more effectively than a method using an ordinary bolt and nut. A conventional method using sleeves as mentioned above is disclosed in detail in WO 94/01687.

However, the above-described conventional art has the following drawbacks. For tightening the sleeve 102, the clamp 108 holding the bolt shaft 101 is pulled out so that the reaction force presses the nose 107 against the sleeve 102. Since the pulling force is directly applied to the bolt shaft 101, the tightening force, which depends on the pulling force, is limited within a range allowed by the strength of the bolt shaft 101. Moreover, if this sleeve tightening operation is to be performed simultaneously on a plurality of bolt shafts, it becomes necessary to provide a plurality of noses 107 each of which has a clamp 108 provided therein and a drive mechanism for the clamp 108, thus complicating apparatus construction. Furthermore, since the tightening force must be controlled corresponding to the strength of each bolt shaft 101, the simultaneous tightening operation on a plurality of bolt shafts requires a complicated control system. Therefore, it is normal practice to perform the tightening operation on one bolt at a time.

Another conventional tightening method is proposed, as illustrated in FIG. 30. In this method, a bolt shaft 110 is positioned by using a stopper 109, and then workpieces $W_1$, $W_2$ and a sleeve 111 are fitted onto the bolt shaft 110. The conical inner wall surface 113 of a tool 112 is pressed against a conical tightening portion 114 of the sleeve 111 to simply compresses the sleeves 111. However, since the sleeve 111 is fastened by pushing the tool 112 so that the thrust is transmitted from the inner wall surface 113 to the tightening portion 114 of the sleeve 111, there is a likelihood that a force unsuitable in magnitude or direction will be applied to the bolt shaft 110, thus bending the bolt shaft 110. Therefore, it is required that the length of the bolt shaft 110 be limited and the sleeve 111 be low and wide in shape, and such requirements impose limitations on where these joining members can be used.

SUMMARY OF THE INVENTION

Accordingly, it is an object of the present invention to enable a fixing member to be tightened to a bolt shaft without applying a unsuitable force to the bolt shaft, by pressing the fixing member to draw its outer wall, so that a sufficient tightening force can be applied without being limited by the strength of the bolt shaft. It is another object of the present invention to simultaneously perform the tightening process on a plurality of joining members.

According to one aspect of the present invention, there is provided a joining jig for coupling joining members that include a bolt shaft and a fixing member to be disposed and tightened onto the bolt shaft for joining a work. The joining jig includes a lower die for supporting a bolt shaft from underneath, and an upper die having at least one nose that has a tightening portion and a relief portion. The upper die presses the fixing member in a direction of a base end of the bolt shaft.

While the lower die supports the bolt shaft in position, the nose of the upper die is pressed against the fixing member disposed on the bolt shaft so that the tightening portion of the nose draws and the outer wall portion of the fixing member, thus tightening the fixing member. As the tightening process proceeds toward the basic and portion of the bolt shaft, the tightened portion of the fixing member progressively enters the reliet portion of the nose.

The joining jig may further include a die parting device for parting the upper die when the upper die is raised after the fixing member is tightened. By separating the work from the upper die, the die parting device prevents the work from being raised together with the upper die when the upper die ascends after the tightening process, although the fixing member is held by the nose during the tightening process.

The die parting device may be a knock pin disposed in the nose. When the upper dic ascends after the tightening process, the knock pin pushes out the bolt shaft and the fixing member held in the nose, thus separating the work from the upper die.

The die parting device may also be a holding member for pressing the work toward the lower die. When the upper die ascends after the tightening process, the holding member holds the work toward the lower die, thus preventing the work from being raised together with the upper die.

In addition, the upper die may have a plurality of noses. Thereby, the joining jig can perform the drawing process simultaneously on a plurality of fixing members.

According to another aspect of the invention, there is provided a work fixing method including the following steps. A distal end portion of a bolt shaft is inserted into a hole formed in a work. A distal end portion of the bolt shaft is inserted into a fixing member. Using a nose having a tightening portion and a relief portion, an outer wall portion of the fixing member is drawn toward a base end portion of the bolt shaft while the work is being pressed toward the base end portion of the bolt shaft.

In this method, the tightening portion of the nose draws the outer wall portion of the fixing member disposed on the bolt shaft toward the base end portion of the bolt shaft while progressively relieving the tightened portion of the fixing member into the relief portion of the nose. Therefore, the fixing method does not directly apply the thrust of the nose to the bolt shaft in the direction of the axis of the bolt shaft. The tightening portion of the nose deforms the fixing member by drawing, and applies pressing force to the fixing member in radial directions, thus tightening the fixing member to the bolt shaft.

In the fixing method of the invention, the fixing member and the work may be provided as a unit. Thereby, the bolt shaft can be inserted into the fixing member simply by inserting it into the hole of the work. Since there is no junction gap between the work and the fixing member, sealing characteristic is improved. Furthermore, the method may perform the drawing process simultaneously on a plurality of bolt shafts, to enable fixation of a work using a plurality of joining members in a single operation cycle. In addition, the work and the bolt shaft may be provided as a unit. Therefore, a stud bolt can be used as a bolt shaft. The applicability of the fixing method is further expanded.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 20 is schematic view illustrating an application of the joining members shown in FIG. 18;

FIG. 21 is a sectional view of the joining members shown in FIG. 20;

FIG. 25 schematically illustrates how a workpiece planted with stud bolts and a workpiece formed together with joining members as shown in FIG. 17 are joined by using the joining jig according to an embodiment;

FIG. 27 schematically illustrates how a workpiece planted with stud bolts and a workpiece formed together with joining members as shown in FIG. 19 are joined by using the joining jig according to an embodiment;

FIG. 28a and 28b are partial sectional view of the joining members shown in FIG. 27, illustrating the states before and after the tightening process, respectively;

DETAILED DFESCRIPTION OF PREFERRED EMBODIMENTS

Preferred embodiments of the present invention will be described in detail hereinafter with reference to the accompanying drawings. Portions comparable to those according to the conventional art will not be described in detail.

Figure 1:
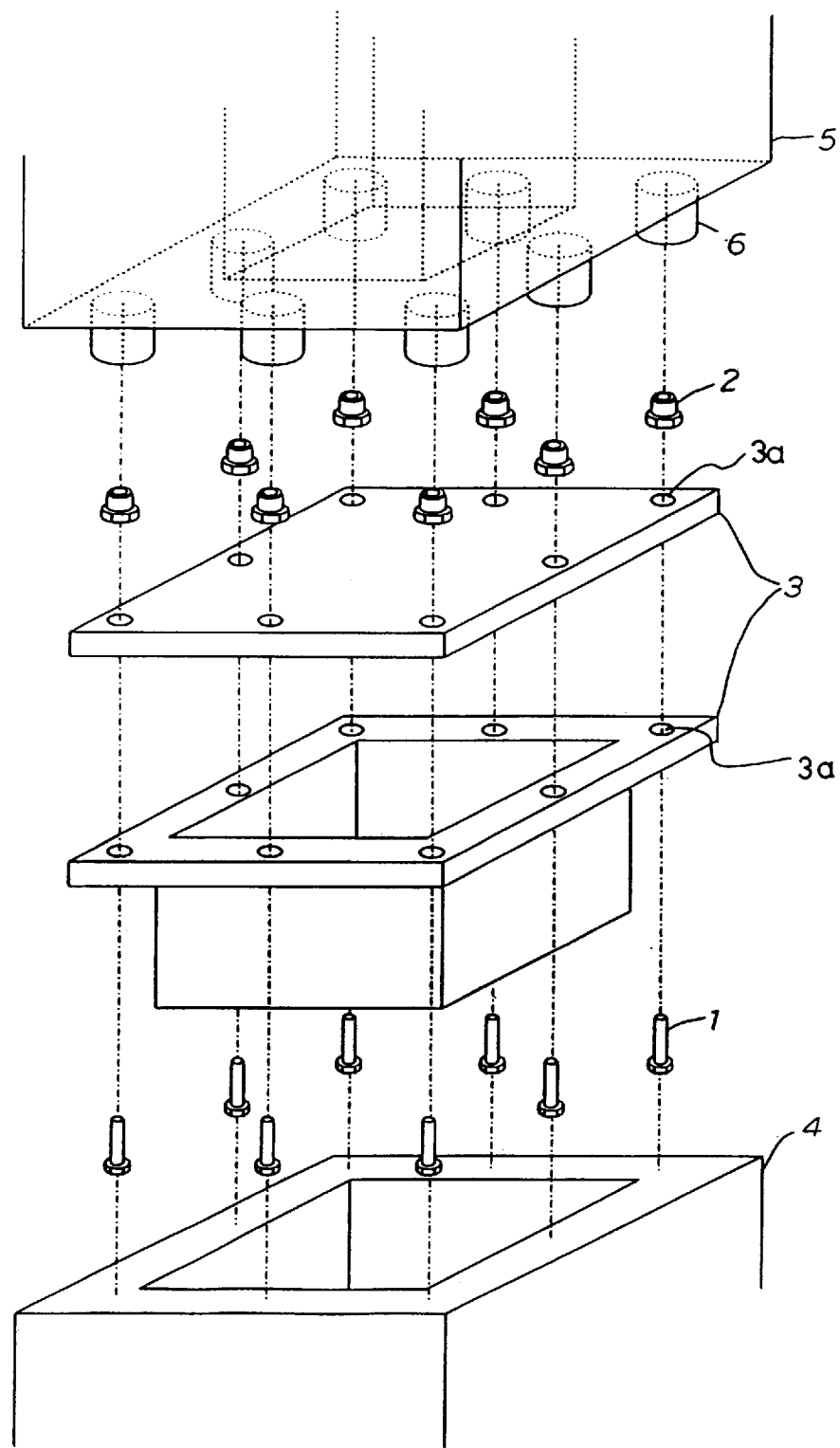
FIG. 1 is a schematic view illustrating how joining members are coupled by using joining jigs according to an embodiment of the present invention.

FIG. 1 illustrates how joining members are coupled by using a joining jig according to an embodiment of the present invention. The joining members are sleeves 2 that are fixing members, and bolt shafts 1 dccording to the embodiment. In the description below, a head portion of each bolt shaft 1 will be referred to as "base end portion", and a distal end of the threaded portion of each bolt shaft 1 will be referred to as "distalendportion". For coupling the joining members, the bolt shafts 1 are arranged at predetermined positions on a lower die 4 (the positions that coincide with holes 3a of workpieces 3). After the work pieces 3 are set on the bolt shafts 1 so that the bolt shafts 1 enters the corresponding holes 3a, the sleeves 2 are loosely fitted onto the bolt shafts 1. Then, an upper die 5 is lowered so that noses 6 formed on the upper die 5 presses the corresponding sleeves 2. Thus, the tightening of the sleeves 2 is simultaneously performed on the plurality of bolt shafts 1.

Figure 2A:
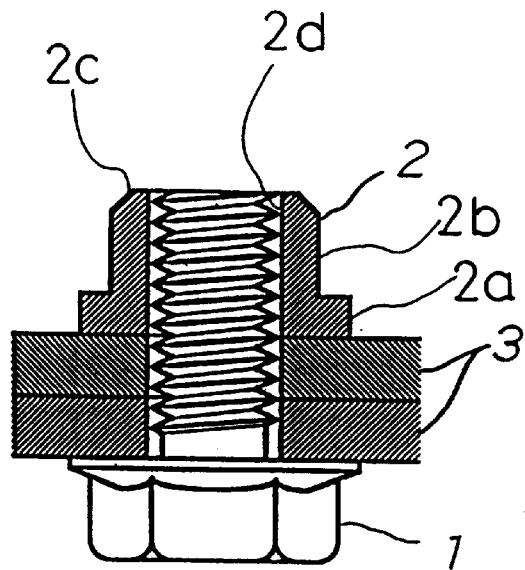
FIGS. 2a and 2b are partial sectional views illustrating the joining members shown in FIG. 1 before and after tightening is performed, respectively.
Figure 2B:
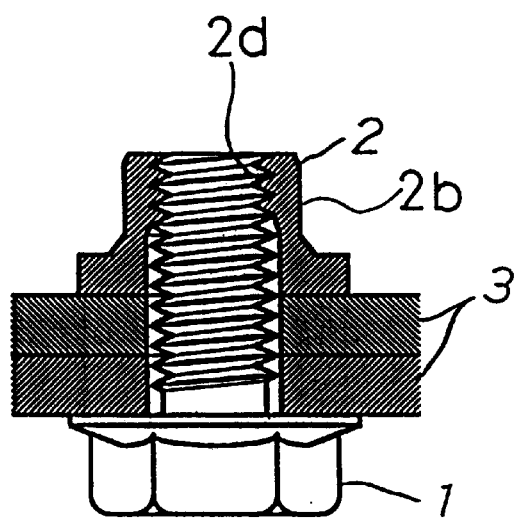

FIGS. 2a illustrates the bolt shaft 1, the sleeve 2 and the workpieces 3 before tightening is performed. The sleeve 2 has a tool engaging portion 2a having a hexagonal shape viewed from above, a generally cylindrical barrel portion 2b that is to be deformed by tightening, and a chamfer 2c formed at the distal end of the barrel portion 2b. A cylindrical hollow portion 2d of the sleeve 2 has an inside diameter larger than the diameter of the bolt shaft 1 to facilitate the entrance of the bolt shaft 1 into the cylindrical hollow portion 2d. FIG. 2b illustrates the bolt shaft 1, the sleeve 2 and the workpieces 3 after tightening is performed. The inside diameter of the cylindrical hollow portion 2d of the sleeve 2 is reduced so that the barrel portion 2b is tightly attached to the bolt shaft 1 and the thread of the bolt shaft 1 is impressed onto the cylindrical hollow portion 2d, thus completing the fastening.

A first embodiment of the joining jig of the present invention and the method of coupling the joining members using the embodiment will be described with reference to FIGS. 3 to 8.

Figure 3:
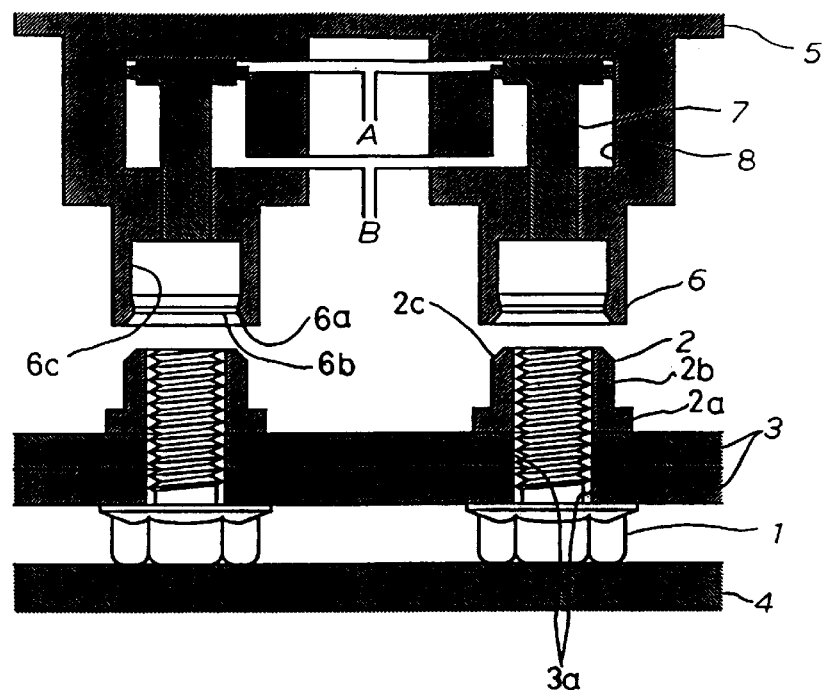
FIG. 3 is a sectional view of a first embodiment of the joining jig of the present invention, illustrating a first step of the joining procedure using the jig.
Figure 4:
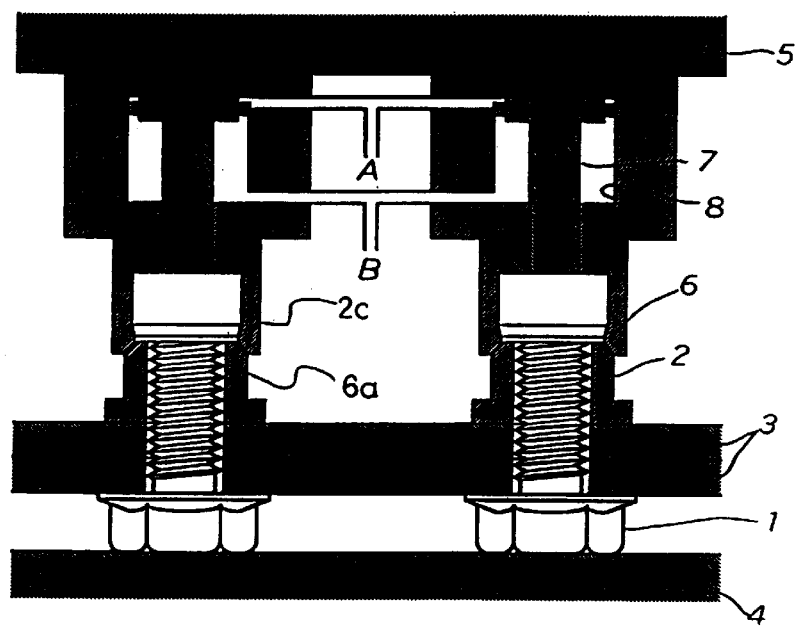
FIG. 4 is a sectional view of the first embodiment, illustrating a second step that follows the step illustrated in FIG. 3.

As shown in FIG. 3, a joining jig has a lower die 4 that supports bolt shafts 1 from underneath, and an upper die 5 having noses 6. Each nose 6 has a cylindrical hollow portion in which a chamfer 6a is formed at the distal inner edge, and a tightening portion 6b immediately above the chamfer 6a. The tightening portion 6b has the smallest inside diameter in the cylindrical hollow portion. The inside diameter increases with increases in distance upward from the tightening portion 6b, thus forming a relief portion 6c. A knock pin 7 is provided inside each nose 7, as a die parting device, to prevent the nose 6 from continuing holding the sleeve 2 when the upper die 5 ascends after tightening, that is, prevent the workpieces 3 from ascending together with the upper die 5. The upper die 5 has cylinders 8 for driving the knock pins 7.

The joining method using the thus-constructed joining jig will be described below. When the upper die 5 is at the top dead center as shown in FIG. 3, bolt shafts 1 are placed at predetermined positions on the lower die 4 and the workpieces 3 are set on the bolt shafts 1 so that each bolt shaft 1 enters a corresponding hole 3a of the workpieces 3. Then a sleeve 2 is disposed onto each bolt shaft 1. The passage B-side of each cylinder 8 of the upper die 5 is pressurized to hold the knock pin 7 at the top dead center. The upper die 5 is then lowered ds shown in FIG. 4 so that the chamfer 6a of each nose 6 closely abuts against the chamfer 2c of the corresponding sleeve 2. The sleeves 2 are thus pressurized to press the workpieces 3 against the base end portions of the bolt shafts 1.

Figure 5:
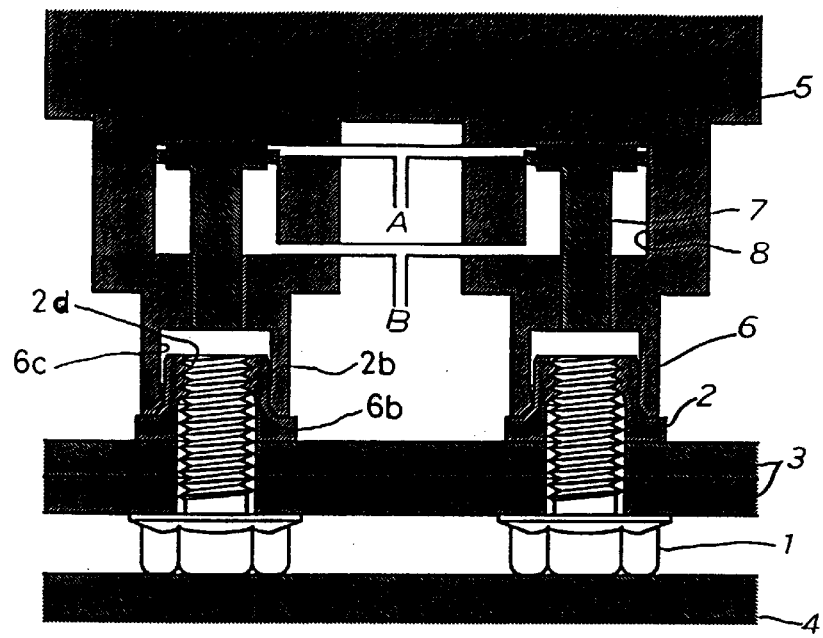
FIG. 5 is a sectional view of the first embodiment, illustrating a third step that follows the step illustrated in FIG. 4.

As the upper die 5 descends to the bottom dead center as shown in FIG. 5, the tightening portion 6b of each nose 6 of the upper die 5 draws the outer wall of the barrel portion 2b of the corresponding sleeve 2, and continues the tightening process toward the base end portion of the bolt shaft 1. As the tightening progresses, the tightened portion of the barrel portion 2b progressively enters the relief portion 6c of the nose 6. When the barrel portion 2b is drawn so that the inside diameter of the cylindrical hollow portion 2d decreases, the cylindrical hollow portion 2d is tightly pressed against the bolt shaft 1 and impressed with the thread of the bolt shaft 1, thus completing fastening.

Figure 6:
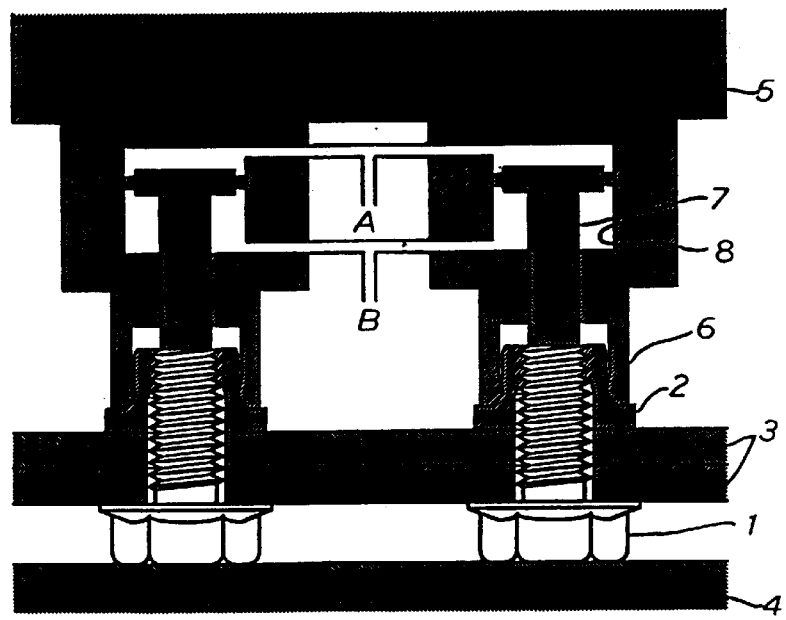
FIG. 6 is a sectional view of the first embodiment, illustrating a fourth step that follows the step illustrated in FIG. 5.
Figure 7:
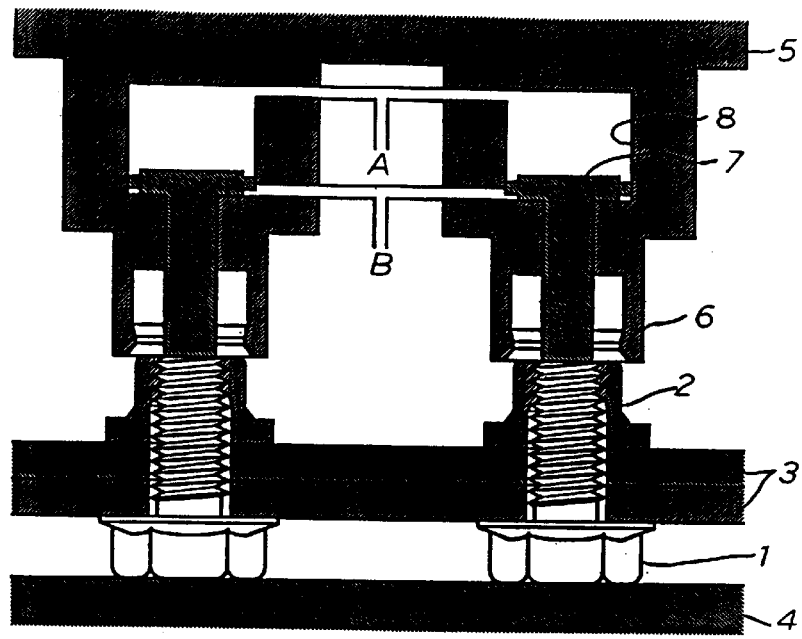
FIG. 7 is a sectional view of the first embodiment, illustrating a fifth step that follows the step illustrated in FIG. 6.
Figure 8:
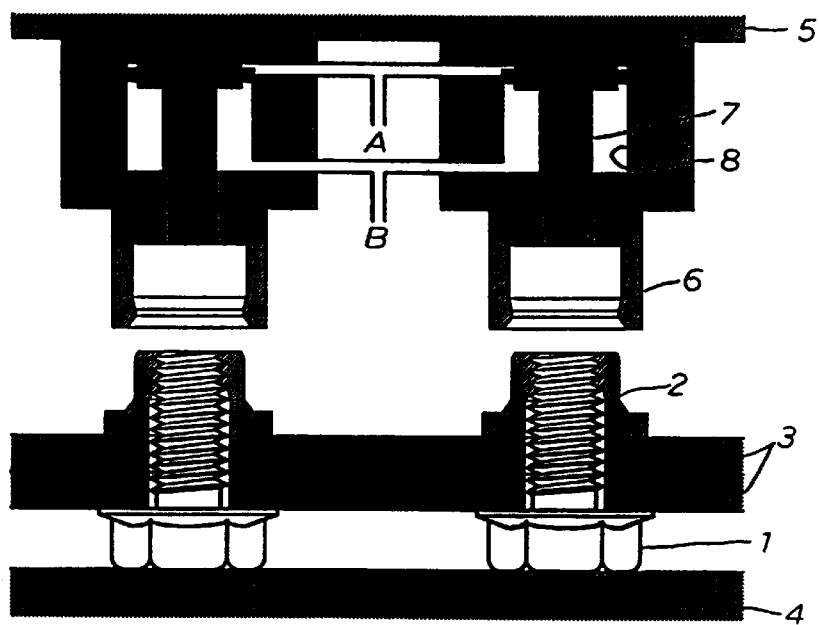
FIG. 8 is a sectional view of the first embodiment, illustrating a sixth step that follows the step illustrated in FIG. 7.

Then, the parting of the upper die 5 is started. First, the passage A-side of each cylinder 8 to the upper die 5 is pressurized to lower the knock pin 7 as shown in FIG. 6, thus pressing the bolt shaft 1 and the sleeve 2 downward. While the upper die 5 is raised as shown in FIG. 7, each knock pin 7 pushes the bolt shaft 1 and the sleeve 2 held by the tightening portion 6b of the nose 6, out of the nose 6, thus promoling the parting of the upper die 5.

Finally, the upper die 5 is raised to the top dead center, and the passage B-side of each cylinder 8 is pressurized to shift the knock pin 7 to the top dead center, as shown in FIG. B. Thus, the operation of simultaneously drawing and tightening the sleeves 2 to the bolt shafts 1 is completed.

A second embodiment of the joining jig of the present invention and the method of joining the joining members using the second embodiment will be described with reference to FIGS. 9 through 14. Portions comparable to those of the first embodiment are represented by comparable reference characters in the drawings and will not be described in detail.

Figure 9:
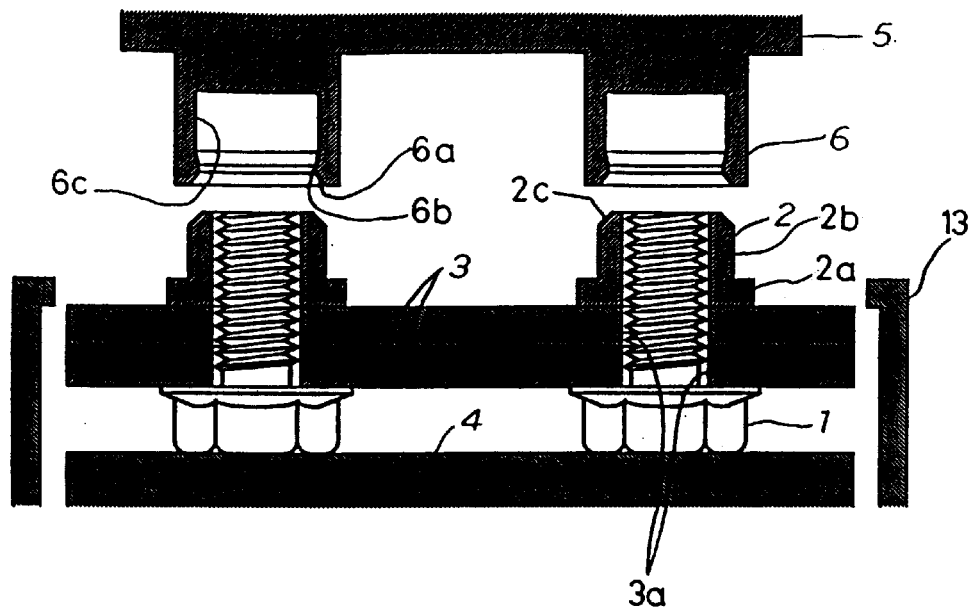
FIG. 9 is a sectional view of a second embodiment of the joining jig of the present invention, illustrating a first step of the joining procedure using the jig.

Unlike the first embodiment illustrated in FIGS. 3 through 8, an upper die 5 of a joining jig according to the second embodiment does not have knock pins disposed in noses 6, as shown in FIG. 9. The second embodiment has a holding device 13 as a die-departing device substituting the knock pins 7. The holding member 13 clamps the workpieces 3 on two sides and presses the workpieces 3 toward a lower die 4. The holding device 13 is engaged and disengaged by an actuator (not shown).

The joining method using the joining jig will be described below. When the upper die 5 is at the top dead center as shown in FIG. 9, bolt shafts 1 are placed at predetermined positions on the lower die 4 and the workpieces 3 are set on the bolt shafts 1 so that the each bolt shaft 1 enters a corresponding hole 3a of the workpieces 3. Then a sleeve 2 is disposed onto each bolt shaft 1. During this operation, the holding device 13 remains disengaged.

Figure 10:
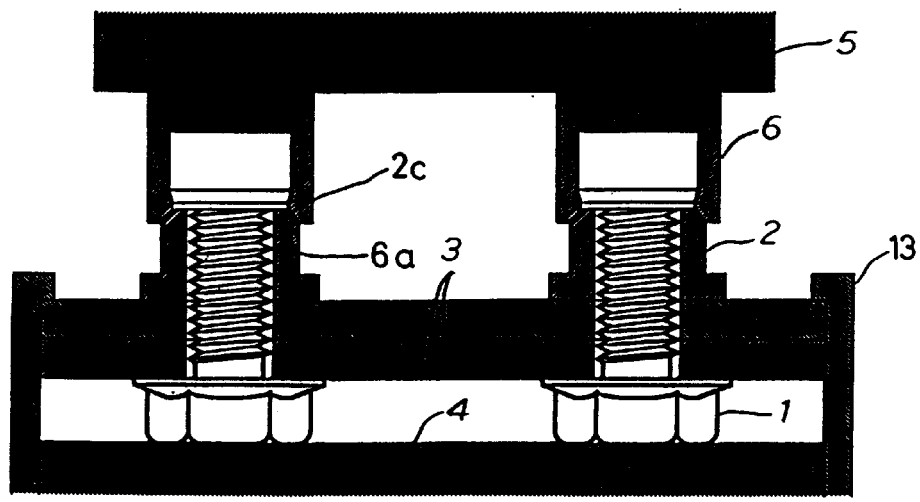
FIG. 10 is a sectional view of the second embodiment, illustrating a second step that follows the step illustrated in FIG. 9.
Figure 11:
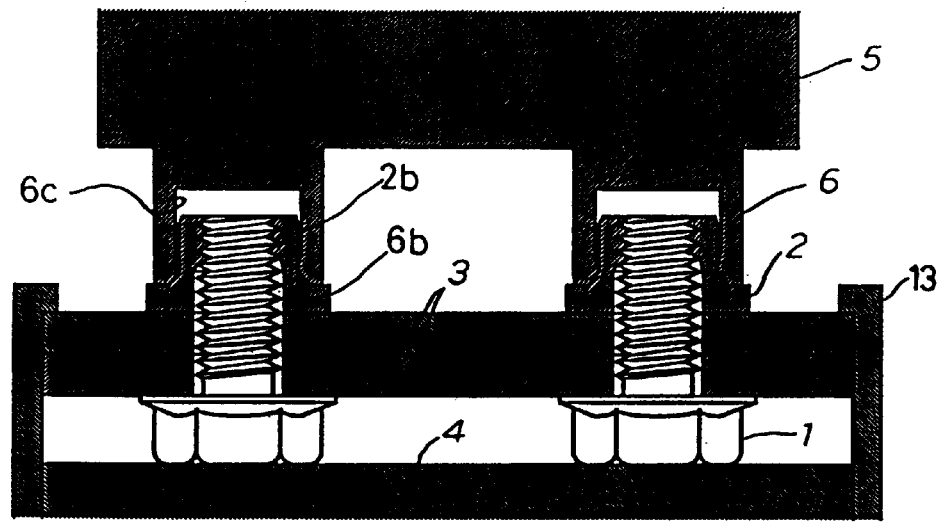
FIG. 11 is a sectional view of the second embodiment, illustrating a third step that follows the step illustrated in FIG. 10.

Then, the holding device 13 is engaged as shown in FIG. 10 to clamp the workpieces 3 on the sides and press the workpieces 3 toward the lower die 4. The workpieces 3 are thereby pressed against the base end portions of the bolt shafts 1. The upper die 5 is lowered so that the chamfer 6a of each nose 6 closely abuts against the chamfer 2c of the corresponding sleeve 2. As the upper die 5 descends to the bottom dead center as shown in FIG. 11, the upper die 5 draws the outer wall of the barrel portion 2b of each sleeve 2 by the tightening portion 6b of the corresponding nose 6 and continues the tightening toward the base end portion of the bolt shaft 1. As the drawing progresses, the tightened portion of the barrel portion 2b is relieved into the relief portion 6c of the nose 6. Since the barrel portion 2b is drawn so that the inside diameter of the cylindrical hollow portion 2d decreases, the cylindrical hollow portion 2d is tightly pressed against the bolt shaft 1 to be impressed with the thread of the bolt shaft 1, thus completing fastening.

Figure 12:
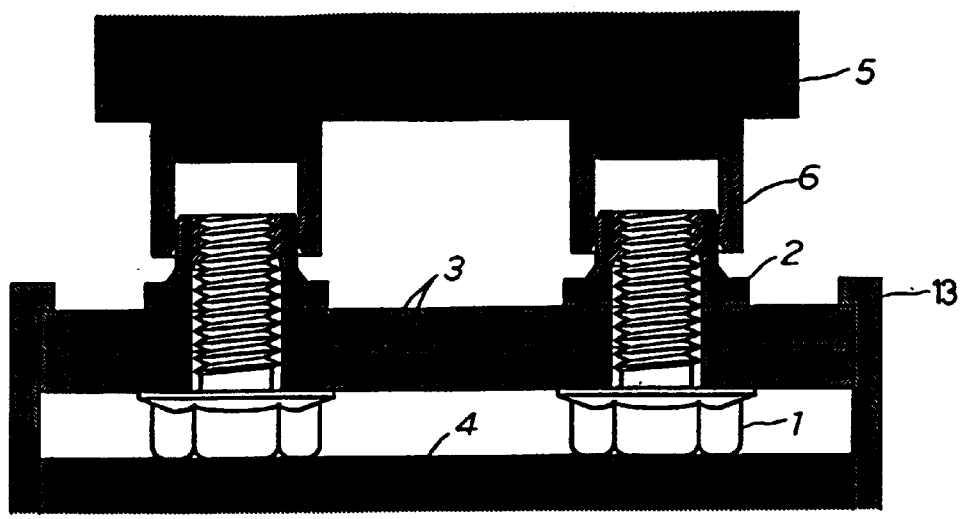
FIG. 12 is a sectional view of the second embodiment, illustrating a fourth step that follows the step illustrated in FIG. 11.
Figure 13:
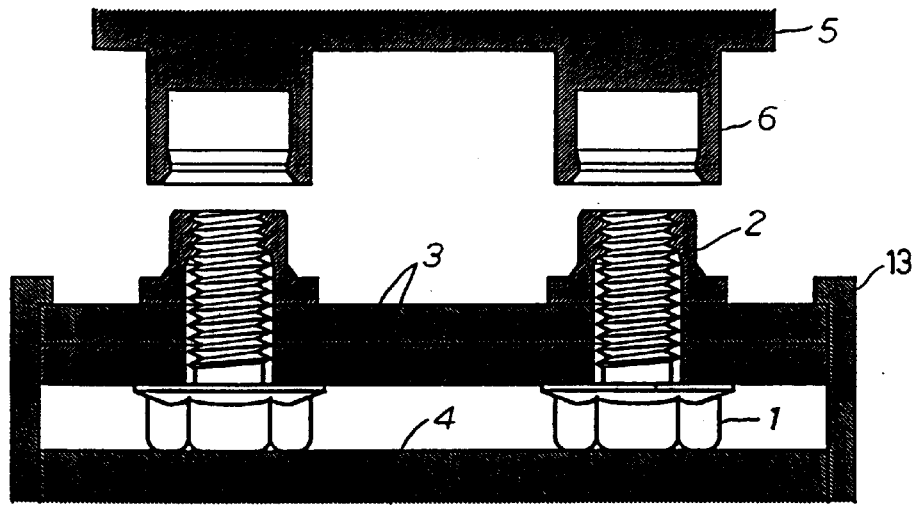
FIG. 13 is a sectional view of the second embodiment, illustrating a fifth step that follows the step illustrated in FIG. 12.
Figure 14:
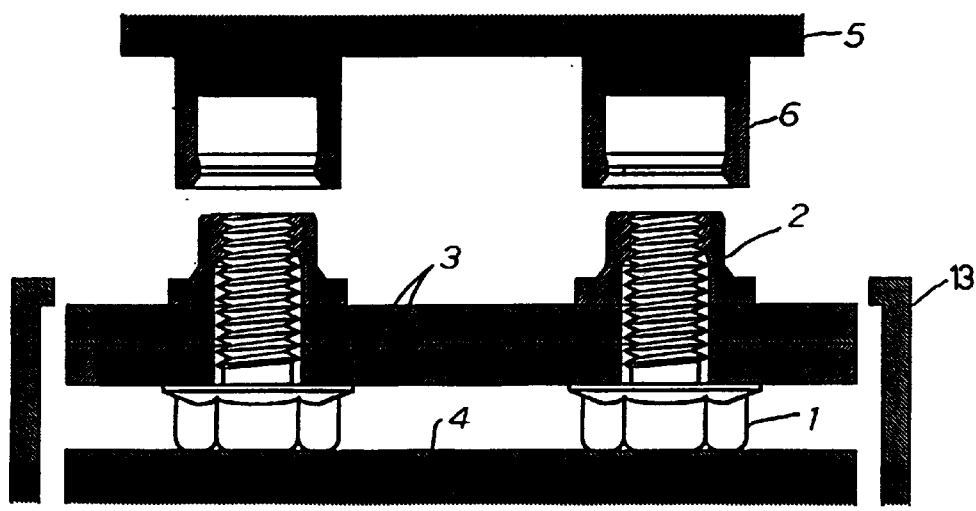
FIG. 14 is a sectional view of the second embodiment, illustrating a sixth step that follows the step illustrated in FIG. 12.

Then, the parting of the upper die 5 is started. First, the upper die 5 is raised while the holding device 13 continues pressing the workpieces 3 toward the lower die 4 as shown in FIG. 12. Since the workpieces 3 are thus held to the lower die 4, the workpieces 3 will not be raised together with the ascending upper die 5 but slip out of the noses 6. The die parting process thus proceeds. Then, the upper die 5 is raised to the top dead center as shown in FIG. 13, and the holding device 13 is disengaged as shown in FIG. 14, thus completing the process of simultaneously drawing the sleeves 2 to the bolt shafts 1.

The operation and advantages of the joining jig according to the foregoing two embodiments are summarized as follows. The joining jig includes the lower die 4 for receiving bolt shafts 1 thereon and supporting them from underneath, and the upper die 5 having the noses 6. The cylindrical hollow portion of each nose 6 has the chamfer 6a at the distal end, and the smallest-diameter tightening portion 6b immediately above the chamfer 6a. The inside diameter increases with increases in distance upward from the tightening portion 6b, thus forming the relief portion 6b. The bolt shafts 1 are placed at predetermined positions on the lower die 4, and withstand the pressure of the upper die 5. The upper die 4 descends so that the chafers 6a of the noses 6 are pressed against the chafers 2c of the sleeves 2 disposed on the bolt shafts 1 and, then, the tightening portions 6b of the noses 6 draw the outer walls of the sleeves 2. The tightened portions of the sleeve 2 are relieved into the relief portions of the noses 6 as the draw-tightening process progresses.

Since the joining jig tightens the sleeves 2 by progressively drawing the outer wall of each sleeve 2 in the direction of the axis of the sleeve 2 instead of simply compressing or squeezing the sleeves 2, the thrust of the nose 6 does not directly act on the bolt shaft 1. Thus, the embodiments substantially eliminate the danger to applying an unsuitable force to any bolt shaft 1 and thereby bending the bolt shaft 1. Therefore, it becomes unnecessary to limit the length of bolt shafts 1 in order to avoid bending a bolt shaft 1, and it becomes possible to freely design the shape of the sleeves 2 without limitations in height or other dimensions. As a result, the joining members according to the embodiments can be used in a wide variety of locations or situations.

Furthermore, since the embodiments do not apply a pulling force on the bolt shafts 1 as is applied by a conventional art, the bolt shafts 1 do not directly receive an axial force. Therefore, the embodiments can apply tightening forces without being restricted by the strength of the bolt shafts 1. In addition, the embodiments are able to perform the tightening operation simultaneously on a plurality of bolt shafts 1 by a simple action, without needing to adjust the tightening force in accordance with the strength of each bolt shaft nor requiring a complicated control operation.

Either of the embodiments employs a die-parting device, that is, the knock pin 7 disposed in each nose 6, or the holding device 13 for clamping the workpieces 3 and pressing them toward or against the lower die 4 by reversible actions, to prevent the workpieces from being raised together with the upper die 5 when the upper die 5 is raised after the tightening process, despite that the sleeves 2 are held in the noses 6 during the tightening process. Thereby, the embodiments ensure that the workpieces will be released from the upper die 5 when the upper die 5 is raised.

The operation and advantages of the joining member coupling methods according to the embodiments are summarized as follows. Either method performs tightening by the tightening portion 6b of each nose 6 drawing the outer wall of the corresponding sleeve 2 on a bolt shaft 1 toward the base end of the bolt shaft 1 while immediately relieving the tightened portion into the relief portion 6c of the nose 6 as the drawing process progresses. In this process, each sleeve 2 is impressed with the thread of the bolt shaft 1 by the pressure radially applied by the tightening portion 6b of the nose 6. Since either method does not directly apply a thrust of the noses 6 to the bolt shafts 1 in the direction of their axes, the methods eliminate the limitations on the tightening force imposed by the strength of the bolt shafts 1. Moreover, it becomes unnecessary to limit the length of the bolt shafts 1 or the height of the sleeves 2 for prevention of deformation of the bolt shafts 1.

Figure 15:
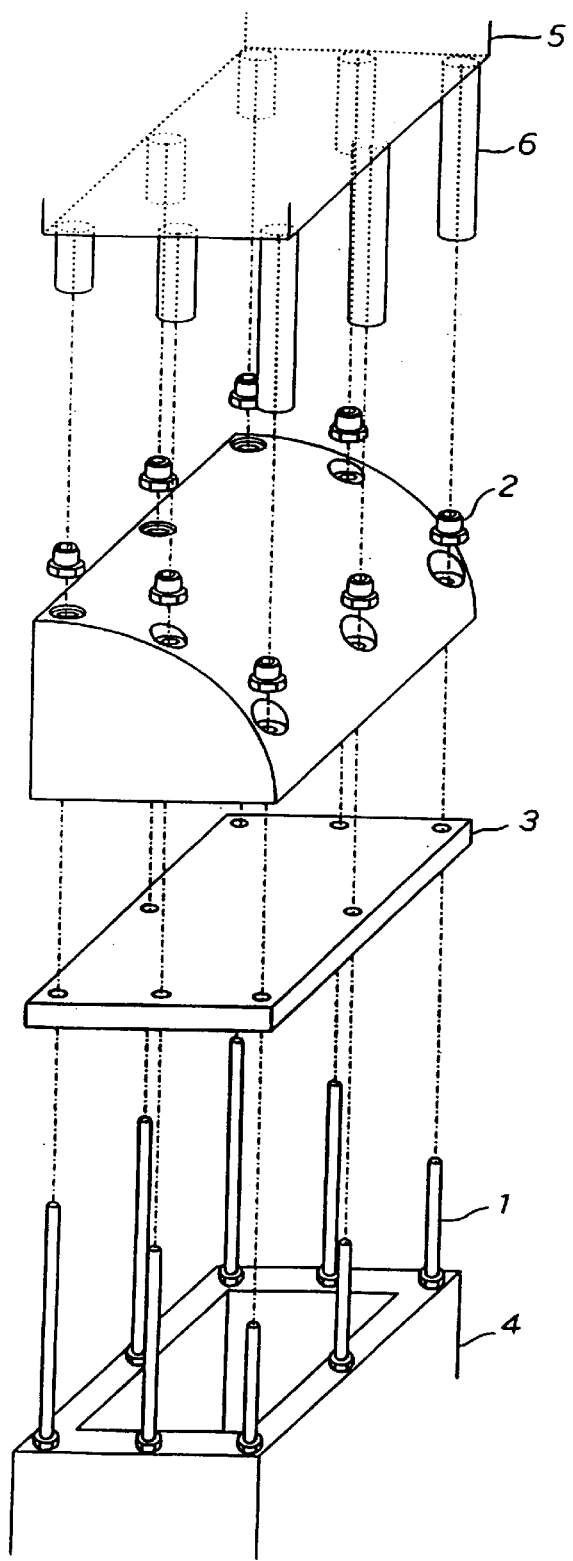
FIG. 15 is a schematic view illustrating a modification where a joining jig according to the present invention is used with a plurality of joining members having different lengths.
Figure 16:
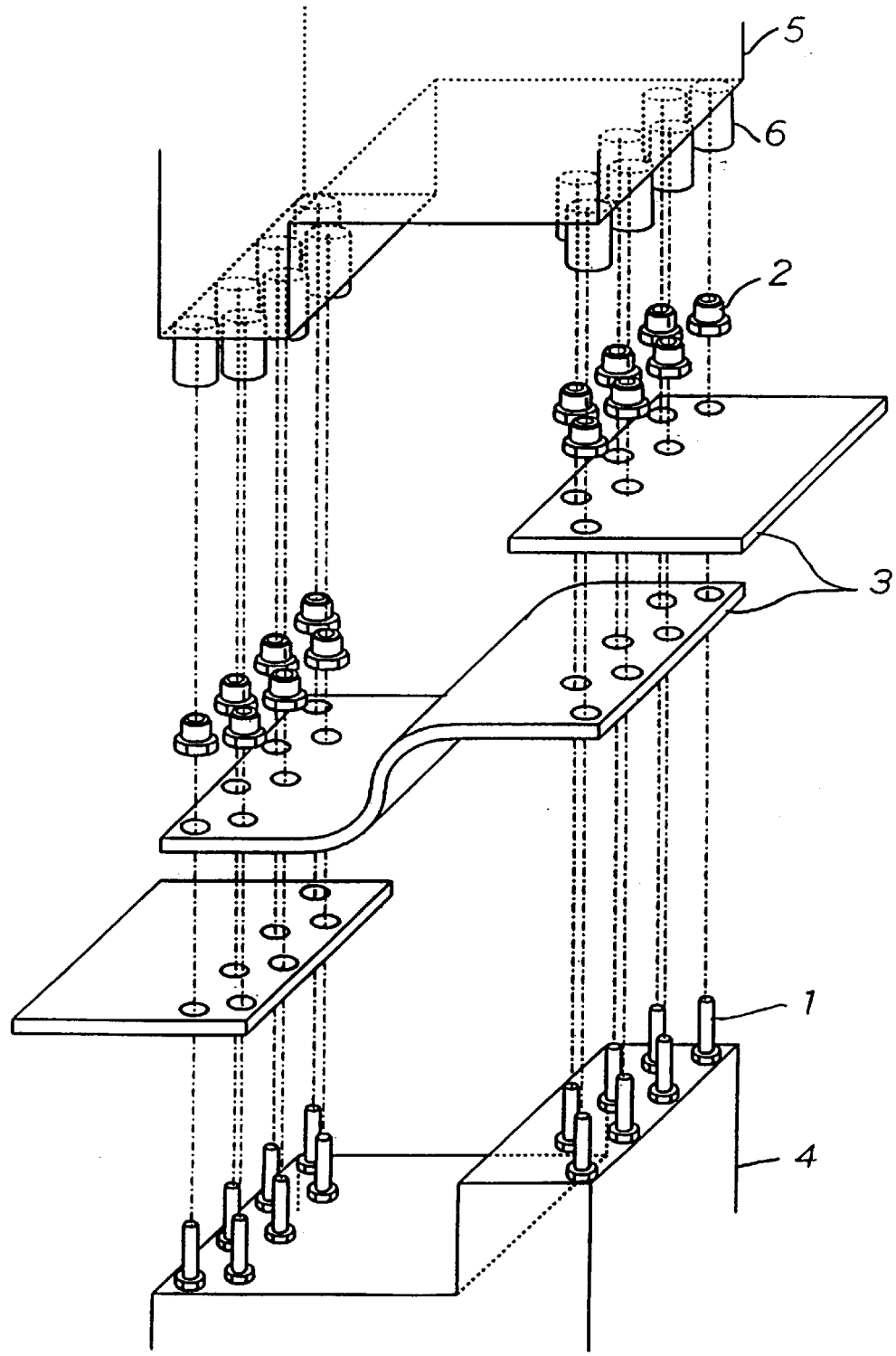
FIG. 16 is a schematic view of a modification where a joining jig according to the present invention is used with a plurality of joining members disposed at different heights.

The joining jig according to either of the above embodiments can cope with a plurality of bolt shafts 1 of different lengths by setting the lengths of the noses 6 of the upper die 5 corresponding to the lengths of the bolt shafts 1 as shown in FIG. 15. In addition, if the sites where the joining members are to be disposed are at different heights, the joining jig according to either embodiment becomes also operative by employing lower and upper dies formed in accordance with the different heights.

Modifications to the embodiments of the present invention will be described below with reference to FIGS. 17a and 17b through 28a and 28b. Portions comparable to those of the above embodiments will be represented by comparable reference characters and will not be described in detail.

Figure 17A:
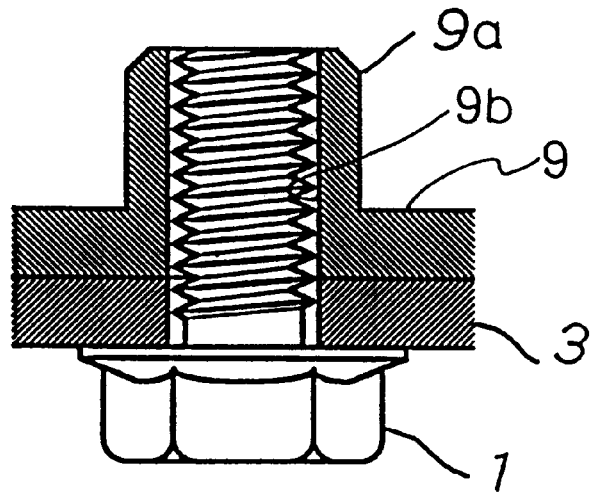
FIGS. 17a and 17b are partial sectional views illustrating a modification to the joining members shown in FIGS. 2a and 2b, before and after the tightening process, respectively.
Figure 17B:
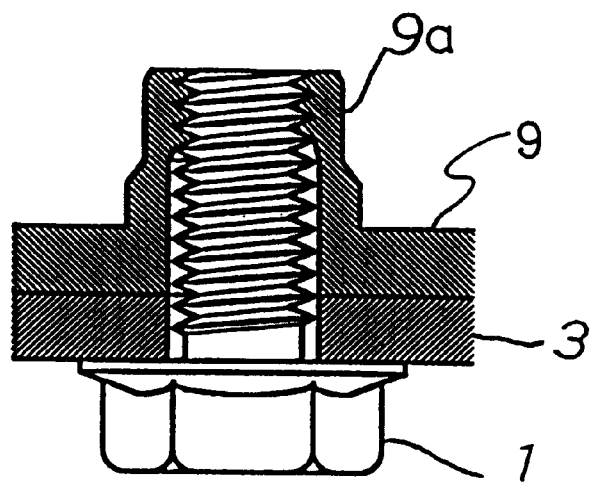

FIGS. 17a and 17b illustrate a modification to the joining members shown in FIGS. 2a and 2b. According to this modification, a workpieces 9 is provided with a sleeve 9a formed together therewith. Such a workpiece can easily be formed by casing or the like. FIGS. 17a and 17b illustrate the states of the workpiece 9 before and after the tightening process, respectively. Since the bolt shaft 1 is inserted into the sleeve 9a simply by inserting the hole 9b of the workpiece 9, this structure reduces the fixing steps and hours as well as the number of component parts, compared with the joining structure where the sleeve is a separate component part. This advantage becomes more evident as the number of sleeves increases.

Figure 18:
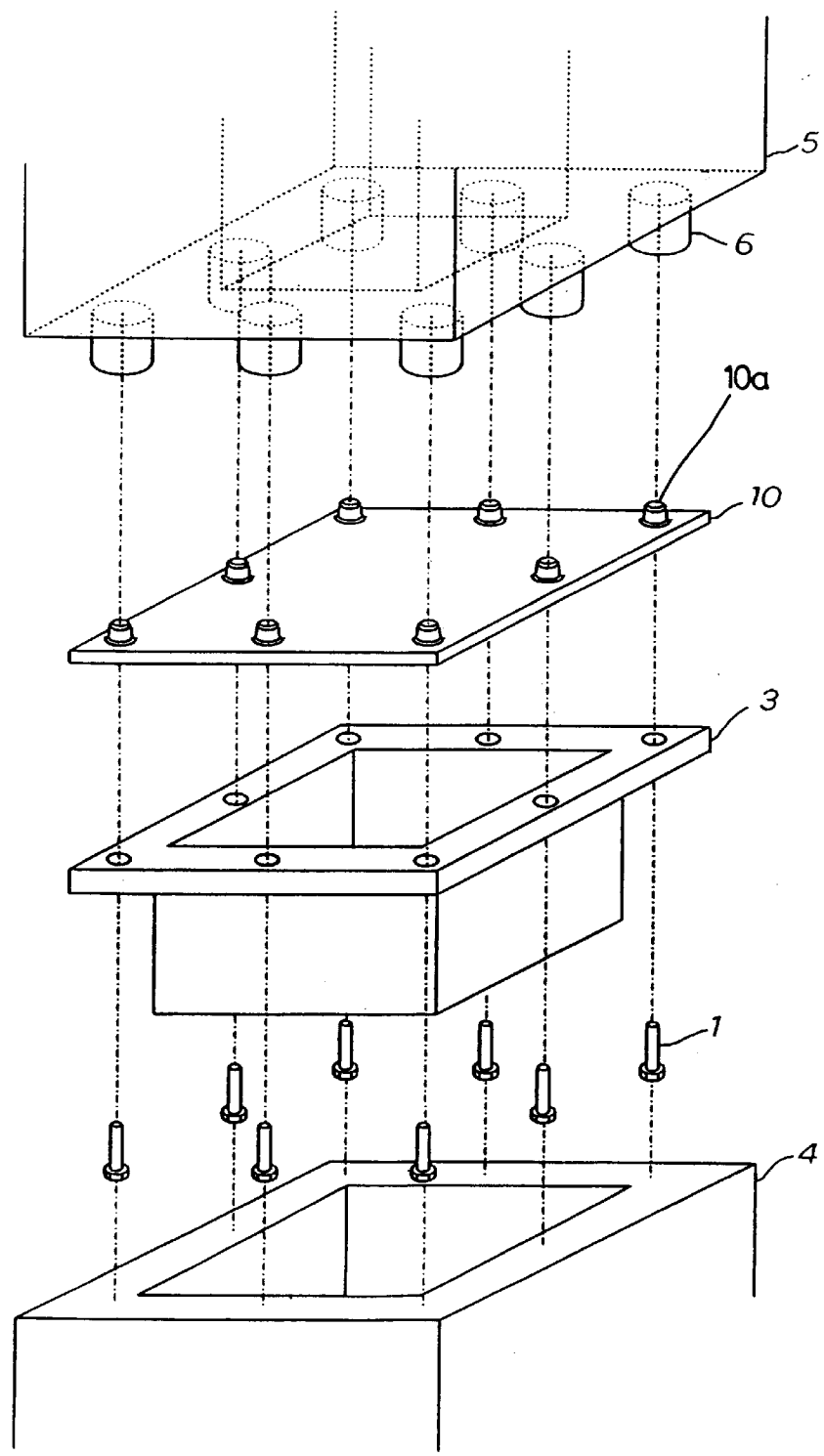
FIG. 18 is a schematic view illustrating a modification to the joining members shown in FIGS. 2a and 2b, where the joining members are coupled by a joining jig according to an embodiment of the present invention.
Figure 19A:
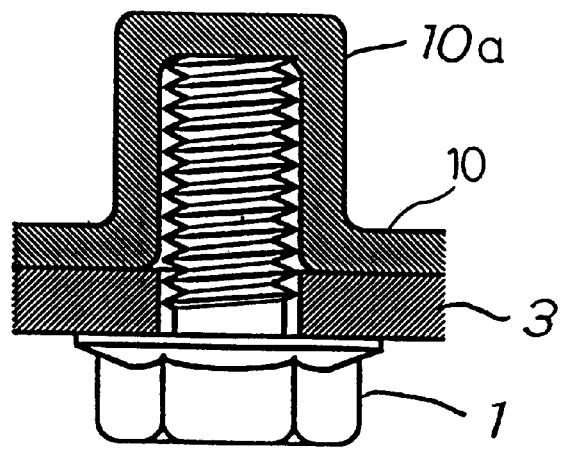
FIGS. 19a and 19b are partial sectional views illustrating the joining members shown in FIG. 18 before and after the tightening process, respectively.
Figure 19B:
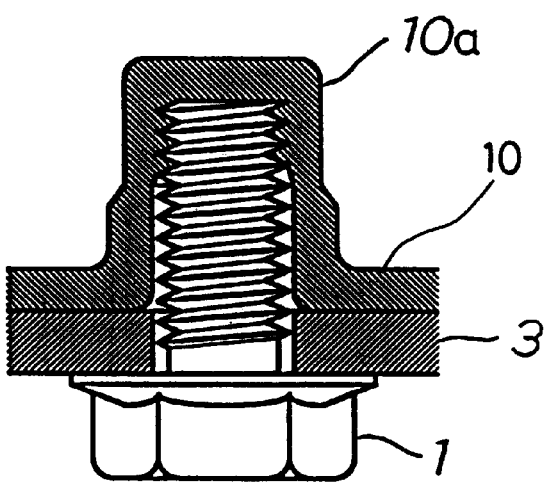
Figure 22:
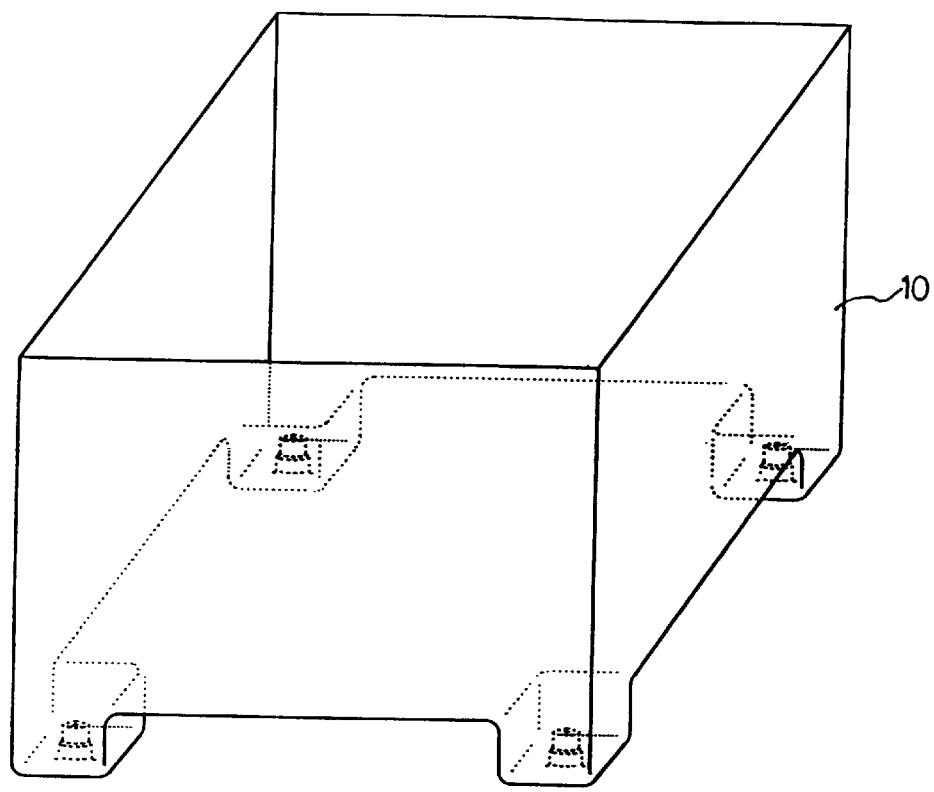
FIG. 22 schematically illustrates another application of the joining members shown in FIG. 18.
Figure 23:
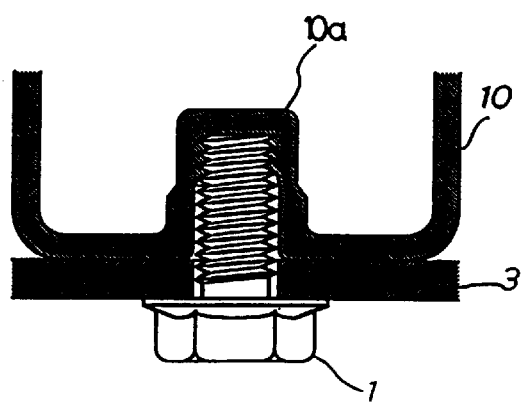
FIG. 23 is a sectional view of the joining members shown in FIG. 22.

FIGS. 18, 19a and 19b shows a further modification to the joining members shown in FIGS. 17a and 17b. According to this modification, a workpiece 10 is provided with bag-like sleeves 10a formed unitarily there with by deep drawing. Such a workpiece 10 can easily formed by press process. FIGS. 19a and 19b show joining members shown in FIG. 18 before and after the sleeve 10a is tightened. This structure also readily achieves insertion of a bolt shaft 1 into a sleeve 10a simply by inserting the bolt shaft 1 into the hole 10b of the workpiece 10, reducing the number of component parts and the processing steps and hours. Furthermore, since there is no junction gap between the workpiece 10 and each sleeve 10a, the structure provides a good sealing characteristic. The structure prevents water leak and corrosion of the joining members when used for fixing a roof material or the like as shown in FIGS. 20 and 21. In addition, if the workpiece 10 is a liquid tank or the like as shown in FIGS. 22 and 23, the structure also prevents liquid leak and corrosion of the joining members.

Figure 24A:
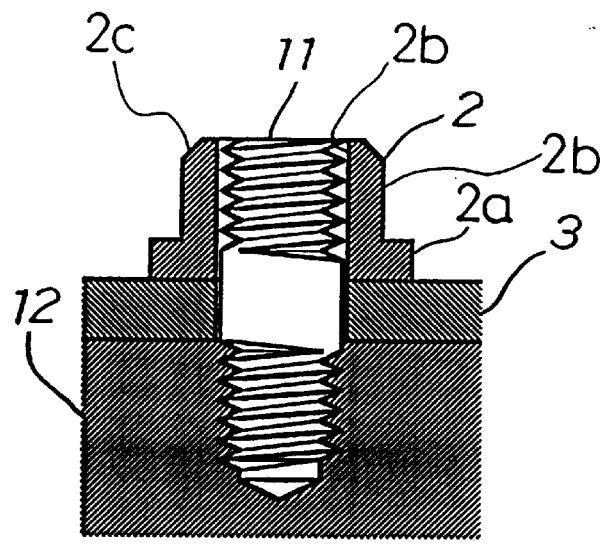
FIGS. 24a and 24b are sectional views of a stud bolt planted in a workpiece, as a substitute for the bolt shaft shown in FIG. 2, illustrating the states before and after the tightening process, respectively.
Figure 24B:
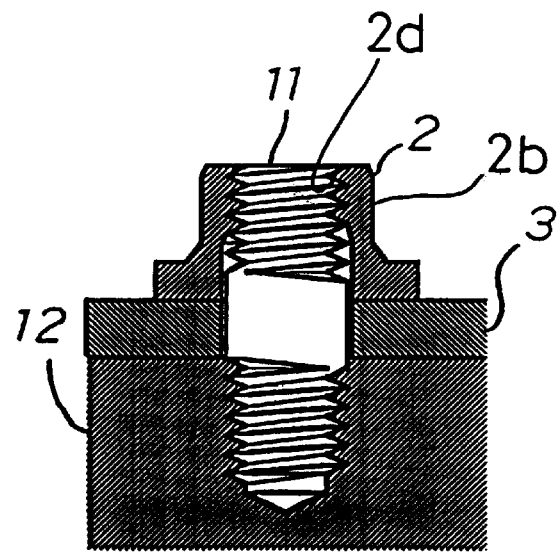

FIGS. 24a and 24b illustrates a modification where the bolt shaft is a stud bolt 11 planted into a workpiece 12. FIGS. 24a and 24b shows the states before and after the tightening process. Since the stud bolt 11 is supported by the workpiece 12, the supporting and positioning of the stub bolt 11 on the lower die 4 of the joining jig (see FIG. 3 or 9) can be accomplished merely by appropriately placing the workpiece 12 on the lower die 4, making it possible to quickly proceed to the drawing of the sleeve 2. The integrated structure of the bolt shaft and the workpiece will expand the applications of the invention.

Figure 26A:
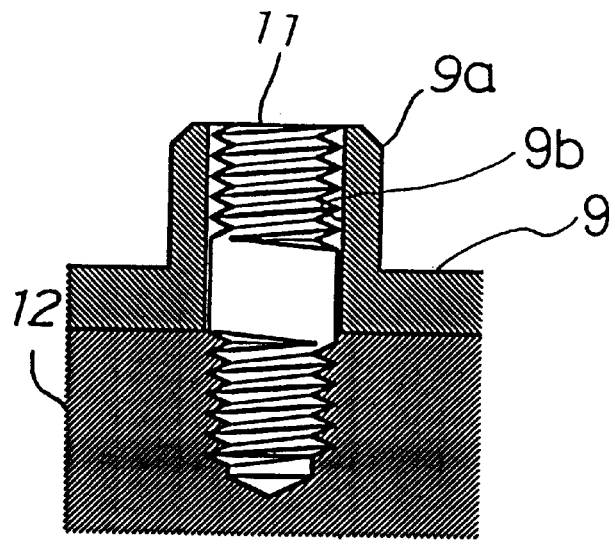
FIGS. 26a and 26b are partial sectional view of the joining mombors shown in FIG. 25, illustrating the states before and after the tightening process, respectively.
Figure 26B:
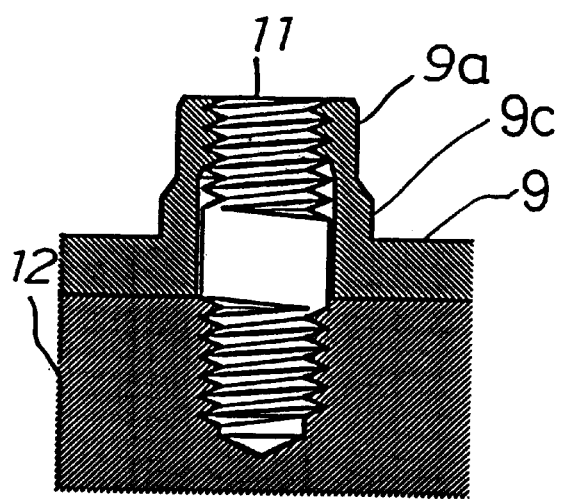
Figure 29:
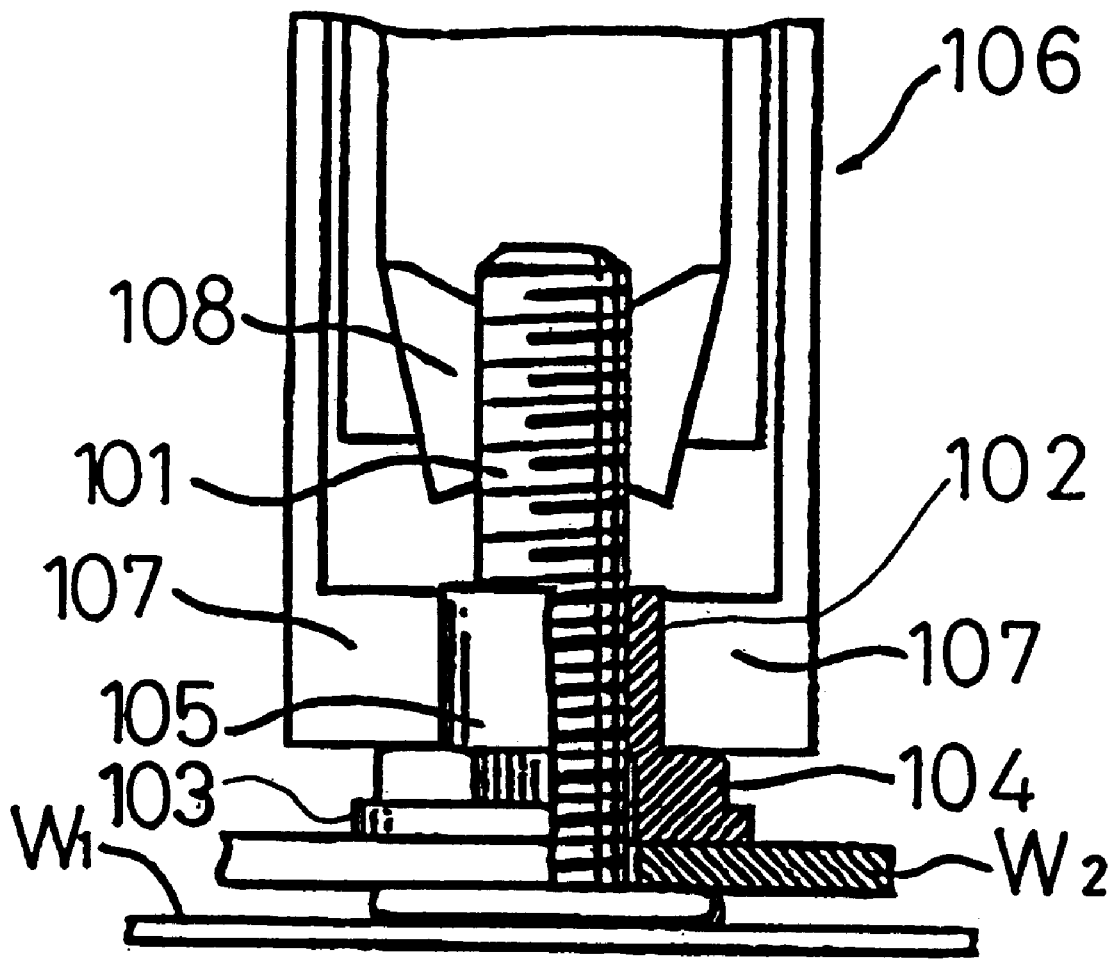
FIG. 29 schematically illustrates a conventional method for coupling joining members.
Figure 30A:
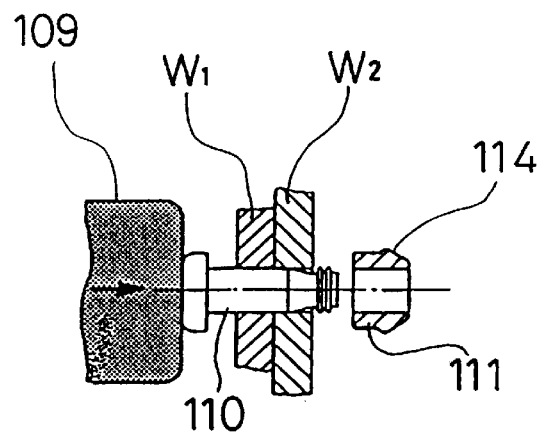
FIGS. 30a, 30b and 30c illustrate the first step, the second step and the third step, respectively, of another conventional method of coupling joining members.
Figure 30B:
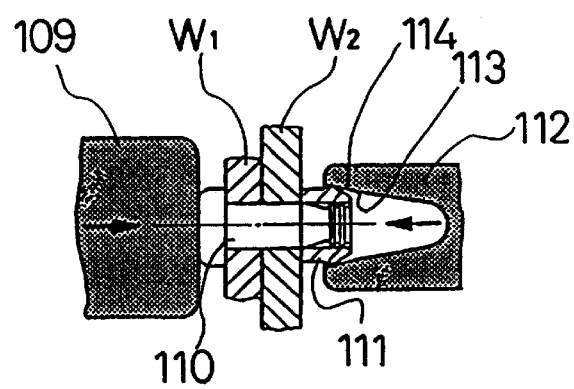
Figure 30C:
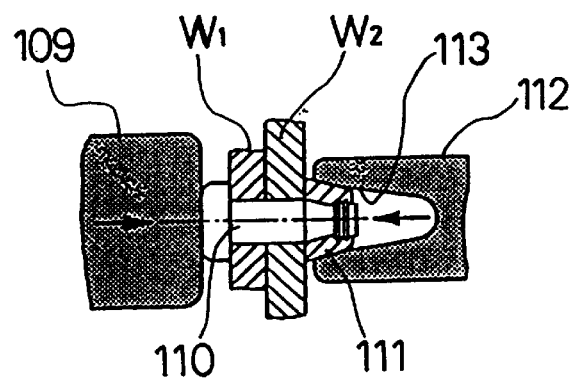

FIG. 25 illustrates a case where a workpiece 12 planted with stud bolts 11 is joined to a workpiece 9 formed together with the sleeves 9a as shown in FIG. 17. FIG. 26a and 26b show the states of the joining members shown in FIG. 25 before and after the tightening process. With this structure, once any one of sleeves 9a is drawn and tightened to the corresponding one of the stud bolts 11, it becomes impossible to turn the workpieces relatively to each other and, therefore, it becomes impossible to disassemble the joined workpieces. However, if the distal end of the stud bolt 11 is provided with a hexagonal socket or the like for rotation of the stud bolt 11, it is still possible to disassemble the joined workpieces.

FIG. 27 illustrates a case where a workpiece 12 planted with stud bolts 11 is joined to a workpiece 10 provided with sleeves 10a formed by deep drawing as shown in FIG. 18. FIG. 28a and 28b show the statics of the joining members shown in FIG. 27 before and after the tightening process. With this structure, once any one of sleeves 10a is drawn and tightened to the corresponding one of the stud bolts 11, it impossible to disassemble the joined workpieces, as described above. The structure also retains a high sealing characteristic. Thus, this modification is useful where disassembly of the joined workpieces is not desired or a high degree of sealing is desired. If disassembly is not needed as in the case shown in FIGS. 27a, 27b and 28, each stud bolt may have a plurality of ring-like threads instead of a spiral thread, achieving substantially the same advantages.

As understood from the above description, the present invention achieves various advantages. Since the joining jig of the invention tightens the fixing members by progressively drawing the outer wall of each fixing member in the direction of the axis of the fixing member instead of simply compressing or squeezing the fixing members, the thrust of the nose does not directly act on the bolt shaft. Thus, the invention substantially eliminates the danger of applying an unsuitable force to any bolt shaft and thereby bending the bolt shaft. Therefore, it becomes unnecessary to limit the length of bolt shafts in order to avoid bending a bolt shaft, and it becomes possible to freely design the shape of the fixing members without limitations in height or other dimensions. As a result, the joining members according to the invention can be used in a wide variety of locations or situations.

Furthermore, since the joining jig of the invention does not apply a pulling force on the bolt shafts as is applied by a conventional art, the bolt shafts, the joining jig can apply tightening forces without being restricted by the strength of the bolt shafts. In addition, the joining jig is able to perform the tightening operation simultaneously on a plurality of bolt shafts by a simple action, without needing to adjust the tightening force in accordance with the strength of each bolt shaft nor requiring a complicated control operation. Further, since the joining jig employs a die-parting device to prevent the workplaces from being raised together with the upper die when the upper die is raised after the tightening process, despite that the fixing members are held in the noses during the tightening process, it ensures that the entire tightening operation will be completed without a failure.

The method of fixing a fixing member of the invention does not directly apply a thrust of the noses to the bolt shafts in the direction of their axes, the method eliminates the limitations on the tightening force imposed by the strength of the bolt shafts. Moreover, it becomes unnecessary to limit the length or the like of the bolt shafts or the height or the like of the fixing members for prevention of deformation of the bolt shafts. The method can be applied to various locations or situations. Further, since the method of the invention makes it possible to perform the tightening operation simultaneously on a plurality of bolt shafts by a single operational cycle, the method reduces the processing hours and, therefore, costs.

If the fixing members are provided integrally or unitarily with a workpiece, the bolt shafts can be inserted into the fixing members simply by inserting the corresponding holes of the workpiece. This structure reduces the fixing steps and hours as well as the number of component parts. This advantage becomes more evident as the number of bolt shafts used increases. Furthermore, this structure eliminates a junction gap between the work and each fixing member, the sealing of the joining members can easily be increased to prevent leakage and corrosion at areas around the joining members.

In addition, if the bolt shafts, such as bolt studs, are provided integrally or unitarily with a workpiece, the applications of the present invention will be further expanded. By combining this bolt-workpiece integral structure with a workpiece having the fixing members that are formed unitarily or integrally therewith, it become possible to enhance the sealing of the joining members. This combination can also make it substantially impossible to disassemble the joined workpieces thus enclosing the joining members in a sealed manner.

While the present invention has been described with reference to what are presently considered to be preferred embodiments thereof, it is to be understood that the invention is not limited to the disclosed embodiments or constructions To the contrary, the invention is intended to cover various modifications and equivalent arrangements included within the spirit and scope of the appended claims.

What is claimed is:

1. A joining jig for coupling a fixing member to a bolt shaft having a base end and a distal end, the fixing member to be placed over the distal end and tightened onto the bolt shaft for joining a work, the joining jig comprising:
   a reaction die for supporting the bolt shaft from the base end thereof; and
   a working die including at least one nose defining an axial chamber extending from an open end of the at least one nose and having a peripheral convex tightening portion projecting inwardly of the chamber at the open end and a relief portion of a larger radial dimension than the tightening portion and positioned axially behind the tightening portion in a direction from the open end, the working die pressing the tightening portion of the at least one nose axially along the fixing member in a direction toward the base end of the bolt shaft so that axial movement of the tightening portion progressively tightens the fixing member onto the bolt shaft.

2. A joining jig according to claim 1, further comprising die parting means for parting the working die when the working die retracts after the fixing member is tightened.

3. A joining jig according to claim 2, wherein the die parting means includes a knock pin provided in the nose.

4. A joining jig according to claim 2, wherein the die parting means includes a holding member that presses the work toward the reaction die.

5. A joining jig according to claim 4, including more than one nose.

6. A joining jig according to claim 3, wherein the number of said at least one nose is greater than one.

7. A joining jig according to claim 2, wherein the number of said at least one nose is greater than one.

8. A joining jig according to claim 1, wherein the number of said at least one nose is greater than one.

9. A joining jig according to claim 1, including a plurality of noses for simultaneously coupling a plurality of fixing members and bolt shafts.

* * * * *